(12) United States Patent  
Zheng

(10) Patent No.: US 9,130,669 B2  
(45) Date of Patent: Sep. 8, 2015

(54) TROUBLESHOOTING METHOD, AGGREGATION NODE, AND OPTICAL NETWORK PROTECTION SYSTEM

(71) Applicant: HUAWEI TECHNOLOGIES CO., LTD., Shenzhen, Guangdong (CN)

(72) Inventor: Ruobin Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 84 days.

(21) Appl. No.: 14/098,988

(22) Filed: Dec. 6, 2013

(65) Prior Publication Data

US 2014/0099097 A1 Apr. 10, 2014

Related U.S. Application Data

(63) Continuation of application No. PCT/CN2012/070529, filed on Jan. 18, 2012.

(30) Foreign Application Priority Data

Jun. 8, 2011 (CN) .......................... 2011 1 0151948

(51) Int. Cl.  
*H04B 10/00* (2013.01)  
*H04B 10/038* (2013.01)  
(Continued)

(52) U.S. Cl.  
CPC .......... *H04B 10/038* (2013.01); *H04L 41/0663* (2013.01); *H04Q 11/0067* (2013.01); *H04Q 2011/0081* (2013.01)

(58) Field of Classification Search  
USPC ........................................................ 398/1–9  
See application file for complete search history.

(56) References Cited

U.S. PATENT DOCUMENTS 6,975,586 B1 * 12/2005 Yoshimura .................... 370/217  
7,948,874 B2 * 5/2011 Tadimeti et al. .............. 370/228  
(Continued)

FOREIGN PATENT DOCUMENTS

CN 101834687 9/2010  
CN 101888324 11/2010  
(Continued)

OTHER PUBLICATIONS

Chinese Office Action dated Jan. 14, 2013 in corresponding Chinese Patent Application No. 201110151948.3.  
(Continued)

*Primary Examiner* — Agustin Bello  
(74) *Attorney, Agent, or Firm* — Staas & Halsey LLP

(57) ABSTRACT

Embodiments of the present invention disclose a troubleshooting method. The method includes: determining, by an aggregation node when a link fault or a device fault occurs on an OLT side, an active logical port used by the active OLT to forward a data packet; searching, by the aggregation node, a locally stored logical port mapping table according to the active logical port to obtain a standby logical port corresponding to the active logical port, where the standby logical port supports a same user service as the active logical port; and triggering, by the aggregation node, the standby OLT to enable the standby logical port to receive a data packet that is sent by the standby OLT through the standby logical port. The implementation of the present invention can provide utmost compatibility with the live network and enable a communication link to recover from a fault quickly.

10 Claims, 6 Drawing Sheets

(51) Int. Cl.
*H04L 12/24* (2006.01)
*H04Q 11/00* (2006.01)

(56) References Cited

U.S. PATENT DOCUMENTS

| | | | | |
|---|---|---|---|---|
| 8,433,194 | B2* | 4/2013 | Nesset et al. | 398/58 |
| 8,755,685 | B2* | 6/2014 | Zheng et al. | 398/2 |
| 8,774,621 | B2* | 7/2014 | Mukai | 398/5 |
| 8,804,720 | B1* | 8/2014 | Rainovic et al. | 370/390 |
| 8,917,723 | B2* | 12/2014 | Zheng et al. | 370/389 |
| 2004/0098501 | A1* | 5/2004 | Finn | 709/236 |
| 2004/0120326 | A1* | 6/2004 | Yoon et al. | 370/395.53 |
| 2007/0268818 | A1* | 11/2007 | Sugihara | 370/216 |
| 2008/0279105 | A1 | 11/2008 | Absillis et al. | |
| 2009/0003337 | A1* | 1/2009 | Daines et al. | 370/389 |
| 2009/0252170 | A1* | 10/2009 | Hu | 370/395.53 |
| 2010/0247098 | A1* | 9/2010 | Nesset et al. | 398/58 |
| 2011/0013903 | A1* | 1/2011 | Rafel Porti et al. | 398/1 |
| 2011/0096670 | A1* | 4/2011 | Cheng et al. | 370/241.1 |
| 2011/0170545 | A1* | 7/2011 | Zheng et al. | 370/392 |
| 2012/0020206 | A1* | 1/2012 | Busi et al. | 370/217 |
| 2012/0113835 | A1* | 5/2012 | Alon et al. | 370/252 |
| 2012/0134664 | A1* | 5/2012 | Zheng et al. | 398/5 |
| 2012/0148230 | A1* | 6/2012 | Dai et al. | 398/5 |
| 2014/0099097 | A1* | 4/2014 | Zheng | 398/5 |

FOREIGN PATENT DOCUMENTS

| | | |
|---|---|---|
| CN | 101998191 | 3/2011 |
| CN | 102215124 | 10/2011 |
| EP | 2148453 | 1/2010 |
| EP | 2 451 119 A1 | 5/2012 |
| WO | 2009/050459 A1 | 4/2009 |
| WO | 2011/022966 A1 | 3/2011 |

OTHER PUBLICATIONS

Chinese Search Report dated Dec. 21, 2012 in corresponding Chinese Patent Application No. 2011101519483.
PCT International Search Report and Written Opinion of the International Searching Authority dated Apr. 26, 2012 in corresponding International Patent Application No. PCT/CN2012/070529.
Stein, Yaakov J., "Advances in Ethernet," PowerPoint presentation for *RAD data communications* (www.rad.com), Jun. 2010, PowerPoint slides 1-153, Unicare Access Solutions.
Extended European Search Report issued Mar. 21, 2014, in corresponding European Patent Application No. 12796626.5.
International Search Report, dated Apr. 26, 2012, in corresponding International Application No. PCT/CN2012/070529 (4 pp.).

* cited by examiner

TROUBLESHOOTING METHOD, AGGREGATION NODE, AND OPTICAL NETWORK PROTECTION SYSTEM

CROSS-REFERENCE TO RELATED APPLICATIONS

This application is a continuation of International Application No. PCT/CN2012/070529, filed on Jan. 18, 2012, which claims priority to Chinese Patent Application No. 201110151948.3, filed on Jun. 8, 2011, both of which are hereby incorporated by reference in their entireties.

TECHNICAL FIELD

The present invention relates to the field of communications technologies, and in particular, to a troubleshooting method, an aggregation node, and an optical network protection system.

BACKGROUND

A passive optical network (Passive Optical Network, PON) technology is a point-to-multiple-point (P2MP) optical access technology. A PON network is formed by an optical line termination (Optical Line Termination, OLT), an optical splitter, an optical network unit (Optical Network Unit, ONU) or an optical network terminal (Optical Network Terminal, ONT), and a fiber that connects such devices.

As a device at a central office end, the OLT is connected with an optical splitter (Optical splitter) or an extender box (EB, Extender Box) through a backbone fiber, and the optical splitter or the EB is connected with each ONU through a separate branch fiber. There is a backbone fiber between the optical splitter or the EB and the OLT, and there are a number of branch fibers between the optical splitter or the EB and the ONU. In the downlink direction (from the OLT to the ONU), the optical splitter or the EB implements an optical splitting function, and sends downlink optical signals of the OLT to all ONUs through the branch fibers; and, in the uplink direction (from the ONU to the OLT), the optical splitter or the EB implements an optical signal aggregation function, and aggregates optical signals sent by all ONUs, and sends the signal to the OLT through the backbone fiber.

Currently, to resist a fault of the backbone fiber between the optical splitter or the EB and the OLT or an OLT fault, a 1+1 protection architecture shown in FIG. 1 is generally adopted, in which an active backbone fiber, a standby backbone fiber, an active OLT and a standby OLT are used to provide 1+1 protection for the backbone fiber and the OLT. When the backbone fiber or the OLT is faulty, the standby OLT takes over the ONU under the original active OLT. An aggregation node (Aggregation Node, AggN, or Aggregation Switch, AGS) is connected with the active OLT and the standby OLT through an active port and a standby port (such as an Ethernet physical port or an Ethernet logical port) respectively; or, there are also an active aggregation node and a standby aggregation node, and the active aggregation node and the standby aggregation node are connected with the active OLT and the standby OLT respectively.

The inventor of the present invention finds that when the active OLT is faulty or the backbone fiber between the active OLT and the optical splitter or the extender box is faulty, data packet forwarding performed in the active OLT needs to be switched to the standby OLT. The existing method of switching from the active OLT to the standby OLT is based on selecting, by a physical port of the active OLT which is used to forward a data packet, a physical port of the standby OLT to take over the forwarding of the data packet, where the standby OLT corresponds to the physical port of the active OLT. However, when a data packet is forwarded through a logical port of the OLT, the switching from the active OLT to the standby OLT cannot be implemented by searching for physical ports that are mutual backups, which makes a communication link unable to recover quickly.

SUMMARY

Embodiments of the present invention provide a troubleshooting method, an aggregation node, and an optical network protection system to solve a technical problem in the prior art that a communication link cannot recover quickly because switching between an active OLT device and a standby OLT device cannot be completed smoothly.

A troubleshooting method provided in an embodiment of the present invention includes:

determining, by an aggregation node when a link fault or a device fault occurs on an active optical line termination OLT side, an active logical port used by the active OLT to forward a data packet, where the active logical port supports at least one user service, and each user service is denoted by a user service identifier (C-VLAN, S-VLAN) formed by a user local area network tag C-VLAN and a service local area network tag S-VLAN;

searching, by the aggregation node, a locally stored logical port mapping table according to the active logical port to obtain a standby logical port corresponding to the active logical port, where the standby logical port supports a same user service as the active logical port; and triggering, by the aggregation node, the standby OLT to enable the standby logical port to receive a data packet that is sent by the standby OLT through the standby logical port.

Further, an embodiment of the present invention provides an aggregation node, including:

a memory, configured to store a table of mapping between logical ports of an active optical line termination OLT and a standby OLT;

a port determining unit, configured to: when a link fault or a device fault occurs on an active OLT side, determine an active logical port used by the active OLT to forward a data packet, where the active logical port supports at least one user service, and each user service is denoted by a user service identifier (C-VLAN, S-VLAN) formed by a user local area network tag C-VLAN and a service local area network tag S-VLAN;

a mapping searching unit, configured to search, according to the active logical port determined by the port determining unit, the logical port mapping table stored in the memory to obtain a standby logical port corresponding to the active logical port, where the standby logical port supports a same user service as the active logical port; and a port enabling unit, configured to trigger the standby OLT to enable the standby logical port to receive a data packet that is sent by the standby OLT through the standby logical port.

Correspondingly, an embodiment of the present invention further provides an optical network protection system, including:

an aggregation node, and at least one active OLT and at least one standby OLT that are connected with the aggregation node, where when a link fault or a device fault occurs on an active optical line termination OLT side, the aggregation node determines an active logical port used by the active OLT to forward a data packet, where the active logical port supports at least one user service, and each user service is denoted by a user service identifier (C-VLAN, S-VLAN) formed by a user local area network tag C-VLAN and a service local area network tag S-VLAN;

the aggregation node searches a locally stored logical port mapping table according to the active logical port to obtain a standby logical port corresponding to the active logical port, where the standby logical port supports a same user service as the active logical port; and the aggregation node triggers the standby OLT to enable the standby logical port to receive a data packet that is sent by the standby OLT through the standby logical port.

In the embodiments of the present invention, a logical port mapping table is stored on an aggregation node. When an active OLT side is faulty, the aggregation node searches the locally stored logical port mapping table. Because the logical port mapping table in the present invention reflects a mapping relationship between logical ports that are mutual backups, and a logical port supports multiple groups of user services denoted by a user service identifier (C-VLAN, S-VLAN), a logical port of a standby OLT can be found quickly for forwarding a data packet directly, which can provide utmost compatibility with the live network and enable quick recovery of a communication link.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
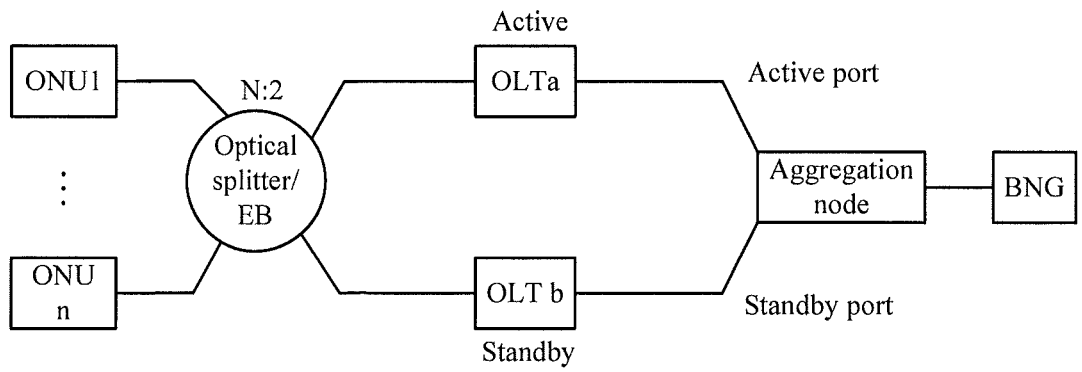
FIG. 1 is a schematic structural diagram of a PON optical network protection system in the prior art.
Figure 2:
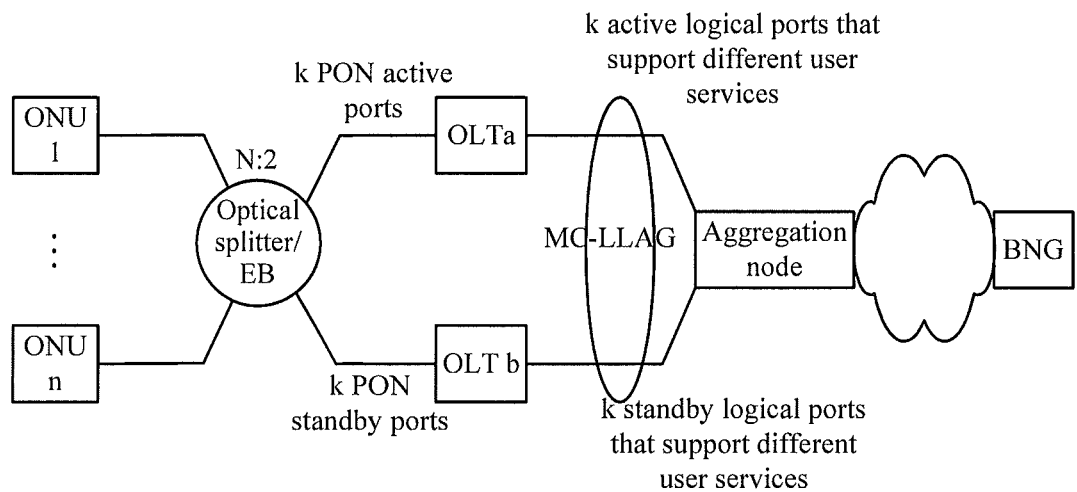
FIG. 2 is a schematic structural diagram of an embodiment of an optical network protection system according to the present invention.

FIG. 2 is a schematic structural diagram of an embodiment of an optical network protection system according to the present invention.

The optical network protection system provided in the embodiment of the present invention includes:

an aggregation node, and at least one active OLT and at least one standby OLT that are connected with the aggregation node, where:

when a link fault or a device fault occurs on an active OLT side, an aggregation node determines an active logical port used by the active OLT to forward a data packet, where the active logical port supports at least one user service, and each user service is denoted by a user service identifier (C-VLAN, S-VLAN) formed by a user local area network tag C-VLAN and a service local area network tag S-VLAN;

the aggregation node searches a locally stored logical port mapping table according to the active logical port to obtain a standby logical port corresponding to the active logical port, where the standby logical port supports a same user service as the active logical port; and the aggregation node triggers the standby OLT to enable the standby logical port to receive a data packet that is sent by the standby OLT through the standby logical port.

Specifically, as shown in FIG. 2, in the embodiment of the present invention, OLTa represents an active OLT, and OLTb represents a standby OLT; the OLTa has k active PON physical ports, and the OLTb has k standby PON physical ports; and the PON physical ports of the OLTa and the PON physical ports of the OLTb are mutual backups.

Each active PON physical port of the OLTa corresponds to an active logical port, the active logical port supports at least one user service, and each user service is denoted by a user service identifier (C-VLAN, S-VLAN) formed by a user local area network tag C-VLAN and a service local area network tag S-VLAN, where the C-VLAN identifies a user or an access line and the S-VLAN identifies an access node or service. An active port mapping table is stored on the OLTa to denote a mapping relationship between the active PON physical port, the active logical port, and the user service. Each active PON physical port corresponds to an active logical port, and the user service supported by each active logical port is different from the user service supported by other active logical ports. As shown in Table 1, the PON physical port 11 may be mapped to the logical port 11', and the logical port 11' supports two user services that are denoted by a user service identifier (000000000001, 000000000011) and a user service identifier (000000000010, 000000000011) respectively. The PON physical port 12 may be mapped to the logical port 12', and the logical port 12' supports three services that are denoted by user service identifiers (000000000011, 000000000011), (000000000100, 000000000011), and (000000000101, 000000000011) respectively.

TABLE 1

| Active port mapping table | | |
| --- | --- | --- |
| Active PON physical port | Active logical port | User service identifier (C-VLAN, S-VLAN) |
| 11 | 11' | (000000000001, 000000000011) |
| | | (000000000010, 000000000011) |
| 12 | 12' | (000000000011, 000000000011) |
| | | (000000000100, 000000000011) |
| | | (000000000101, 000000000011) |
| ... | | |

Similarly, a standby port mapping table is stored on the OLTb to denote the mapping relationship between the standby PON physical port, the standby logical port, and the user service. Each standby PON physical port corresponds to a standby logical port, the user service supported by each standby logical port is different from the user service supported by other standby logical ports, and the service supported by each standby logical port is the same as the service supported by the corresponding active logical port. It is assumed that the standby PON physical ports 21 and 22 are standby physical ports of the active PON physical ports 11 and 12 respectively, and that the standby logical ports 21' and 22' are standby logical ports of the active logical ports 11' and 12' respectively, the standby port mapping table stored on the OLTb is shown in Table 2.

TABLE 2

| Standby port mapping table | | |
|---|---|---|
| Standby PON physical port | Standby logical port | User service identifier (C-VLAN, S-VLAN) |
| 21 | 21' | (000000000001, 000000000011) (000000000010, 000000000011) |
| 22 | 22' | (000000000011, 000000000011) (000000000100, 000000000011) (000000000101, 000000000011) |
| ... | ... | ... |

Table 1 and Table 2 indicate the mapping relationship between the logical ports and the PON ports of the OLT devices, and the mapping relationship between the logical ports and the user services supported by the logical ports. The logical port mapping table stored on the aggregation node will be further described in the subsequent embodiment.

Figure 3:
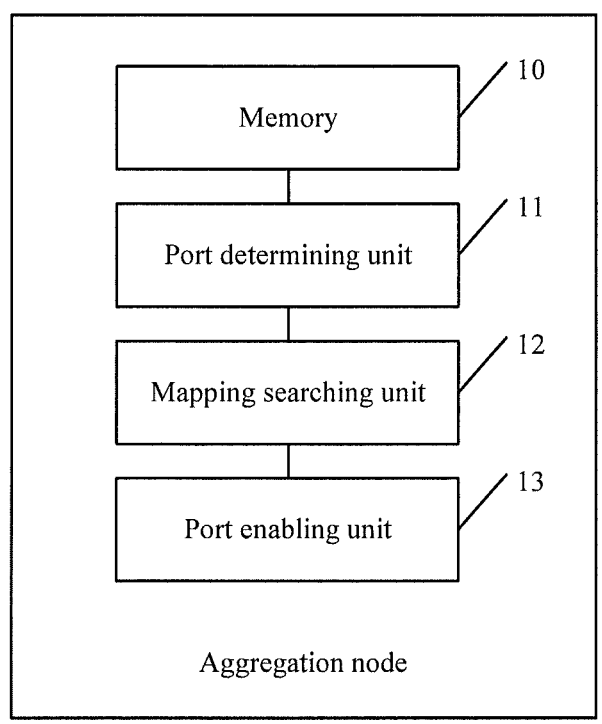
FIG. 3 is a schematic structural diagram of an embodiment of an aggregation node according to the present invention.

FIG. 3 is a schematic structural diagram of an embodiment of an aggregation node according to the present invention.

Specifically, the aggregation node provided in the present invention includes:

a memory 10, configured to store a table of mapping between logical ports of an active OLT and a standby OLT;

a port determining unit 11, configured to: when a link fault or a device fault occurs on an active OLT side, determine an active logical port used by the active OLT to forward a data packet, where the active logical port supports at least one user service, and each user service is denoted by a user service identifier (C-VLAN, S-VLAN) formed by a user local area network tag C-VLAN and a service local area network tag S-VLAN;

a mapping searching unit 12, configured to search, according to the active logical port determined by the port determining unit 11, the logical port mapping table stored in the memory 10 to obtain a standby logical port corresponding to the active logical port, where the standby logical port supports a same user service as the active logical port; and a port enabling unit 13, configured to trigger the standby OLT to enable the standby logical port to receive a data packet that is sent by the standby OLT through the standby logical port.

Specifically, the logical port mapping table stored in the memory 10 stores multiple logical ports that are mutual backups. In the multiple logical ports that are mutual backups, the active logical port and the standby logical port belong to different OLT devices.

The logical port mapping table is specifically shown in Table 3, in which the columns of logical ports that are mutual backups give the active logical port and the standby logical port that are mutual backups. For example, the standby logical port of the active logical port 11' is the logical port 21', and the standby logical port of the active logical port 12' is the standby logical port 22'; the active logical port belongs to the active OLT, and the standby logical port belongs to the standby OLT, that is, the active logical port and the standby logical port belong to different OLT devices, and therefore, a configuration mode of an active logical port and a standby logical port is herein called a multi-chassis logical link aggregation group (MC-LLAG, multi-chassis logic LAG).

TABLE 3

| Logical port mapping table | | |
|---|---|---|
| Active logical port | Standby logical port | User service identifier (C-VLAN, S-VLAN) |
| 11' | 21' | (000000000001, 000000000011) (000000000010, 000000000011) |
| 12' | 22' | (000000000011, 000000000011) (000000000100, 000000000011) (000000000101, 000000000011) |
| ... | ... | ... |

It is assumed that the OLTa has k PON physical ports, which are PON physical port 11, PON physical port 12, ..., and PON physical port 1n, and that the OLTb has k PON physical ports, which are PON physical port 21, PON physical port 22, ..., and PON physical port 2n.

The PON physical port 11 of the OLTa corresponds to the logical port 11', the PON physical port 12 corresponds to the logical port 12', the PON physical port 21 of the OLTb corresponds to the logical port 21', and the PON physical port 22 corresponds to the logical port 22'; and the logical port 11' and the logical port 21' are mutual backups, and the logical port 12' and the logical port 22' are mutual backups.

It should be noted that if the OLTa is not directly connected with the aggregation node, the OLTa periodically exchanges a continuity detection packet such as an OAM (Operation, Administration and Maintenance, operation, administration and maintenance) message or a BFD (Bidirectional Forwarding Detection, bidirectional forwarding detection) message with the aggregation node to judge a physical port fault; and, if the OLTa is directly connected with the aggregation node, the physical port fault may be judged by detecting an optical signal of the physical port.

In the embodiment of the present invention, a data packet is forwarded through a logical port. The logical port supports multiple user services, and each user service is denoted by a user service identifier (C-VLAN, S-VLAN) formed by a user local area network tag C-VLAN and a service local area network tag S-VLAN, where the C-VLAN is used to identify a user or an access line and the S-VLAN is used to identify an access node or service. When a link fault or a device fault occurs on the OLTa side, the data packet needs to be switched to the OLTb for forwarding. Therefore, in the embodiment of the present invention, the logical ports that belong to the OLTa and the OLTb respectively and support the same user service are configured to be in an active-standby relationship, which is stored in a logical port mapping table on the aggregation node. When the OLTa side is faulty, by searching the locally stored logical port mapping table, the aggregation node can find a logical port of the OLTb quickly and can also forward the data packet through the standby logical port directly, which can provide utmost compatibility with the live network and enable quick recovery of the communication link.

The following describes an embodiment of a method for an aggregation node to implement switching from an active OLT to a standby OLT device to forward a data packet in an optical network protection system in the present invention.

Figure 4:
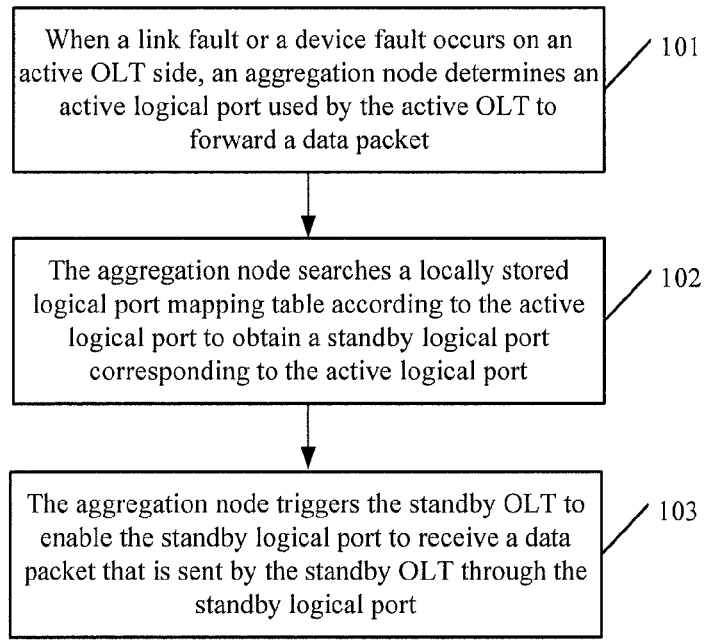
FIG. 4 is a schematic flowchart of Embodiment 1 of a troubleshooting method according to the present invention.

FIG. 4 is a schematic flowchart of Embodiment 1 of a troubleshooting method according to the present invention.

Step 101: When a link fault or a device fault occurs on an active OLT side, an aggregation node determines an active logical port used by the active OLT to forward a data packet, where the active logical port supports at least one user service, and each user service is denoted by a user service identifier (C-VLAN, S-VLAN) formed by a user local area network tag C-VLAN and a service local area network tag S-VLAN.

Step 102: The aggregation node searches a locally stored logical port mapping table according to the active logical port to obtain a standby logical port corresponding to the active logical port, where the standby logical port supports a same user service as the active logical port.

Step 103: The aggregation node triggers the standby OLT to enable the standby logical port to receive a data packet that is sent by the standby OLT through the standby logical port.

The troubleshooting method provided in the embodiment of the present invention is applicable to the optical network protection system provided in the preceding embodiment. The link fault on the active OLT side in the embodiment of the present invention includes: an active fiber link fault on the active OLT side or an uplink physical port fault of the active OLT; and the device fault on the active OLT side includes: an active OLT fault or a PON physical port fault of the active OLT. The following embodiment describes a specific method procedure for handling a link fault or a device fault that occurs on the active OLT side.

Figure 5:
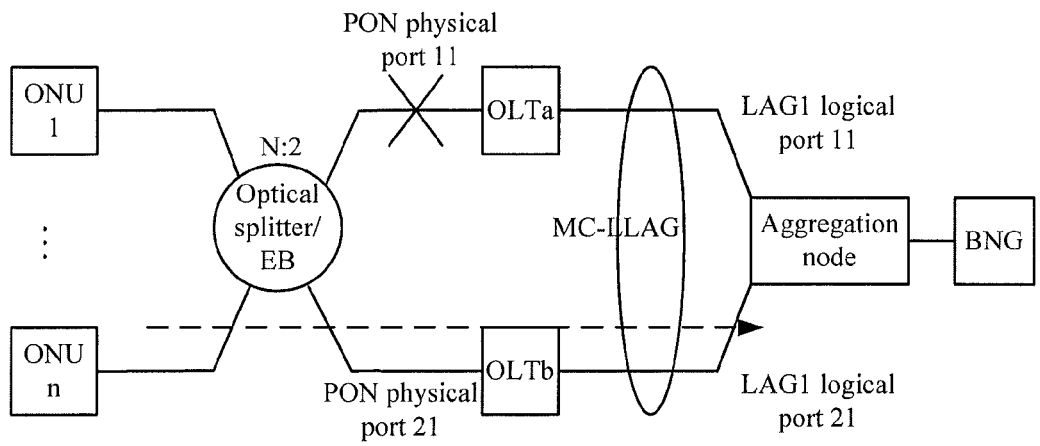
FIG. 5 is a schematic diagram of a fault of a fiber link or an active PON port on an active OLT side in an optical network protection system according to the present invention.

FIG. 5 is a schematic diagram of a fault of a fiber link on an active OLT side or a fault of an active PON physical port in an optical network protection system according to the present invention.

Figure 6:
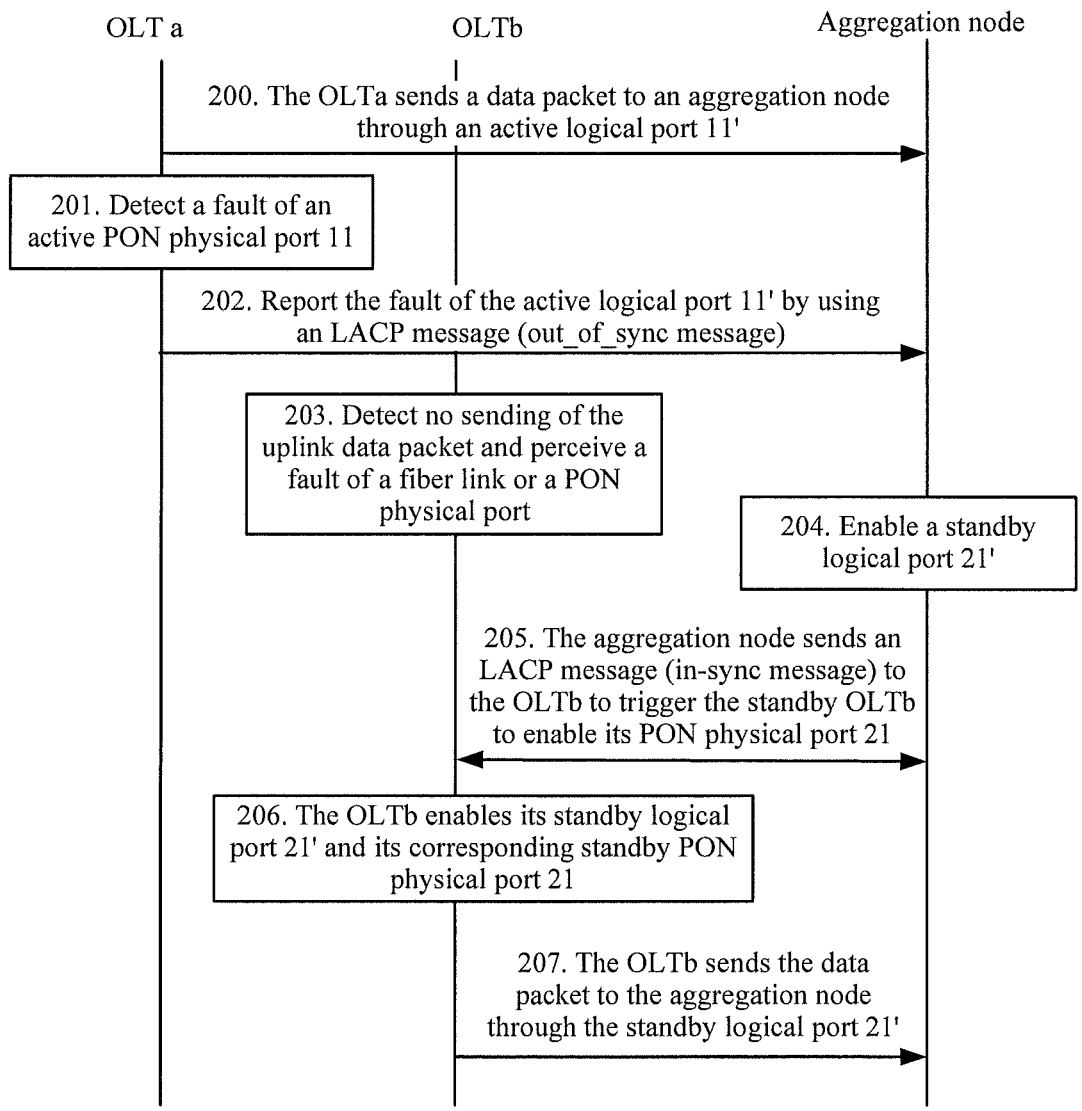
FIG. 6 is a schematic flowchart of Embodiment 2 of a troubleshooting method according to the present invention.

FIG. 5 shows a scenario in which a PON port 11 on the OLTa side is faulty, and in this case, the troubleshooting method provided in the present invention can solve the issue of switching between the active OLT and the standby OLT. With reference to the contents in Table 1, Table 2, and Table 3, as shown in FIG. 6, the troubleshooting method in the present invention may include the following steps:

Step 200: The OLTa sends a data packet to an aggregation node through an active logical port 11', where a user service identifier of the data packet may be (000000000001, 000000000011) or (000000000010, 000000000011).

Step 201: The OLTa detects a fault of the active PON physical port 11.

Step 202: The OLTa reports the fault of the active logical port 11' by using an LACP message (out_of_sync message), where the LACP message may denote the active logical port 11' by carrying an active logical port number 11' or by carrying a user service identifier (C-VLAN, S-VLAN) supported by the active logical port 11'.

Step 203: The OLTb detects no sending of the uplink data packet, and perceives that a fiber link on the OLTa side or a PON physical port is faulty; optionally, the OLTa may send a notification to the OLTb actively to indicate that the fiber link on the OLTa side or the PON physical port is faulty.

Step 204: The aggregation node enables the standby logical port 21'. Specifically, when knowing that the active logical port 11' is faulty, the aggregation node searches a locally stored logical port mapping table, and searches, according to the port number 11', for a standby logical port that serves as its mutual backup to obtain the standby logical port 21'.

Step 205: The aggregation node sends an LACP message (in-sync message) to the OLTb, where the LACP message carries a port number 21' of the standby logical port, and instructs the OLTb to enable its logical port 21' and the PON physical port 21 corresponding to the logical port 21'.

Step 206: The OLTb enables its standby logical port 21' and its corresponding standby PON physical port 21.

Step 207: The OLTb sends a data packet to an aggregation node through the standby logical port 21', where the user service identifier (C-VLAN, S-VLAN) of the data packet is (000000000001, 000000000011) or (000000000010, 000000000011).

A different service identifier of the user service supported by the standby logical port may also be configured.

In the embodiment of the present invention, a logical port mapping table is stored on the aggregation node. When the active OLT side is faulty, by searching the locally stored logical port mapping table, the aggregation node can find a logical port of the standby OLT quickly and forward the data packet directly, which can provide utmost compatibility with the live network and enable quick recovery of the communication link.

Figure 7:
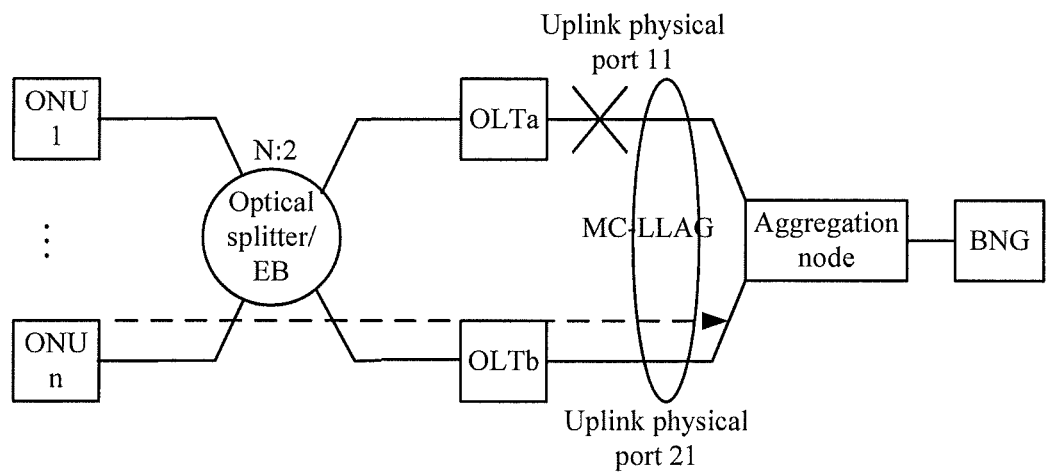
FIG. 7 is a schematic diagram of a fault of an uplink physical port on an active OLT side in an optical network protection system according to the present invention.
Figure 8:
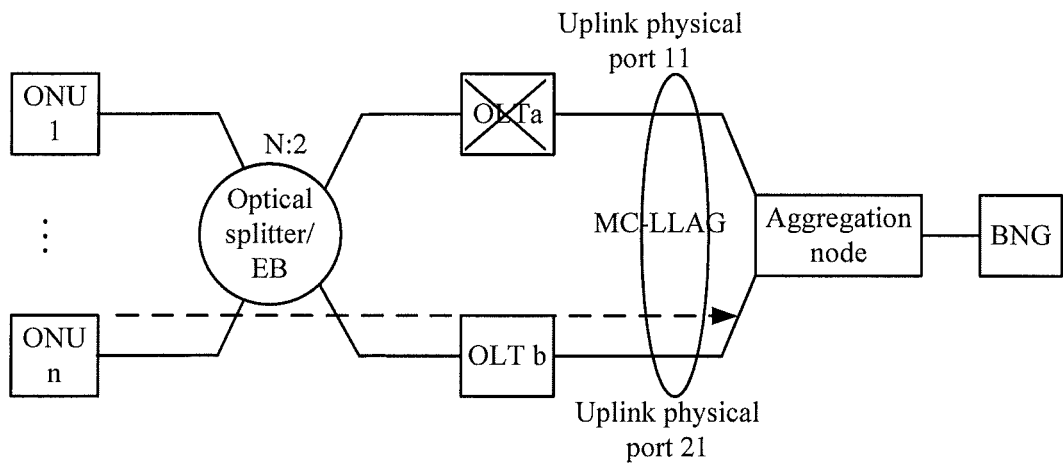
FIG. 8 is a schematic diagram of a fault of an active OLT in an optical network protection system according to the present invention.

Referring to FIG. 7 and FIG. 8, FIG. 7 is a schematic diagram of a fault of an uplink physical port on an active OLT side in an optical network protection system according to the present invention, and FIG. 8 is a schematic diagram of a fault that occurs on the active OLT side.

Figure 9:
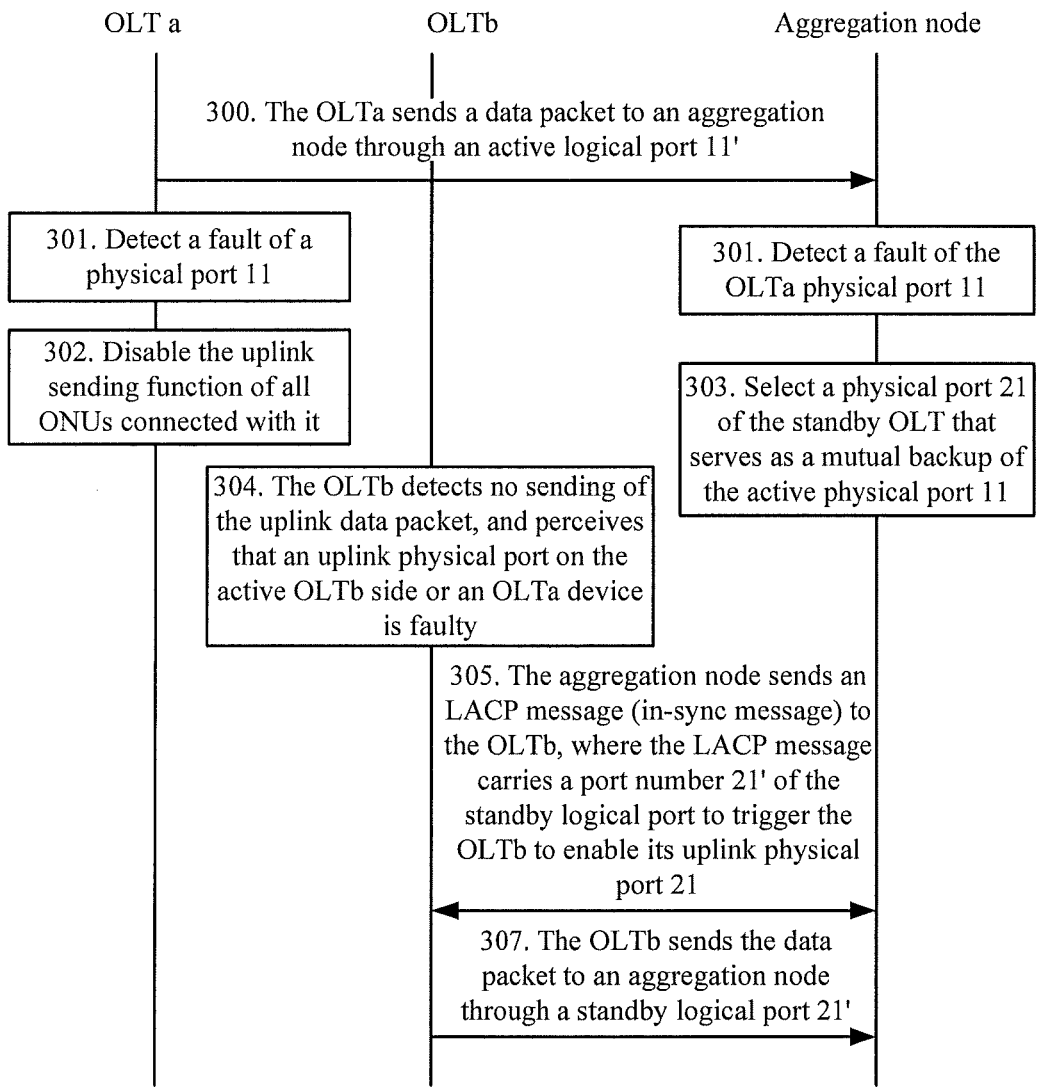
FIG. 9 is a schematic flowchart of Embodiment 3 of a troubleshooting method according to the present invention.

FIG. 7 and FIG. 8 show a scenario in which an uplink physical port on the OLTa side is faulty or the OLTa is faulty, and in this case, the troubleshooting method provided in the present invention can solve the issue of switching between the active OLT and the standby OLT. Specifically, refer to FIG. 9, which is a schematic flowchart of a troubleshooting method according to Embodiment 3 of the present invention.

In this embodiment, the troubleshooting method includes the following steps:

Step 300: The OLTa sends a data packet to an aggregation node through an active logical port 11', where a user service identifier of the data packet may be (000000000001, 000000000011) or (000000000010, 000000000011).

Step 301: The OLTa detects a fault of the physical port 11, and the aggregation node detects a fault of the PON physical port 11 of the OLTa. If the OLTa is not directly connected with the aggregation node, the OLTa periodically exchanges a continuity detection packet such as an operation, administration and maintenance OAM (Operation, Administration and Maintenance) message or a bidirectional forwarding detection BFD (Bidirectional Forwarding Detection) message with the aggregation node to judge a physical port fault; and, if the OLTa is directly connected with the aggregation node, the physical port fault may be judged by detecting an optical signal of the physical port.

Step 302: The OLTa disables the uplink sending function of all ONUs connected with it.

Step 303: The aggregation node searches Table 3 to obtain the standby logical port 21' corresponding to the active logical port 11'.

Step 304: The OLTb detects no sending of the uplink data packet, and perceives that a physical port on the OLTa side or an OLTa device is faulty; optionally, the OLTa may send a notification message to the OLTb actively to indicate that the uplink physical port on the OLTa side or the OLTa device is faulty.

Step 305: The aggregation node sends an LACP message (in-sync message) to the OLTb, where the LACP message carries a port number 21' of the standby logical port, and instructs the OLTb to enable its logical port 21' and the PON physical port 21 corresponding to the logical port 21'.

Step 306: The OLTb sends a data packet to an aggregation node through the standby logical port 21', where a user service identifier (C-VLAN, S-VLAN) of the data packet is (000000000001, 000000000011) or (000000000010, 000000000011).

In the foregoing embodiment, an LACP message is used between the active/standby OLT and the aggregation node to transmit the indication of the fault of the fiber link or the PON physical port on the active OLT side. In a different scenario, the aggregation node may exchange an OAM message or a continuity detection packet with the active OLT to detect whether a link fault or a device fault occurs on the active OLT side.

In the embodiment of the present invention, different user service identifiers may be set on the active OLT and the standby OLT separately to denote the same service. For example, on the active OLT, (000000000001, 000000000011) is used to denote service 1, and, on the standby OLT, (000000000001, 000000000022) is used to denote service 1. In this case, the port mapping relationship table on the aggregation node needs to include the active logical port, the standby logical port, the user service identifier on the active OLT, and the user service identifier on the standby OLT, which may be added on the basis of Table 3.

In the embodiment of the present invention, an active-standby relationship is configured between the logical port of the active OLT and the logical port of the standby OLT, and is stored in a logical port mapping table, and the logical port mapping table is stored on the aggregation node. When the active OLT side is faulty, by searching the locally stored logical port mapping table, the aggregation node can find a logical port of the standby OLT quickly. Because the standby logical port supports the same user service denoted by the user service identifier (C-VLAN, S-VLAN) as the active logical port, the data packet can be forwarded through the standby logical port directly, which provides utmost compatibility with the live network and enables quick recovery of the communication link.

From the description in the foregoing embodiments, a person skilled in the art may be clearly aware that the present invention may be implemented through software plus a necessary hardware platform, or all through hardware. Based on such an understanding, all or a part of the technical solutions of the present invention contributing to the prior art may be implemented in a form of a software product. The computer software product may be stored in a storage medium, such as a ROM/RAM, a magnetic disk, and an optical disk, and includes several instructions for instructing a computer device (which may be a personal computer, a server, or a network device or the like) to perform the methods described in each embodiment or certain parts of the embodiments of the present invention.

The foregoing disclosed descriptions are merely exemplary embodiments of the present invention, but are not intended to limit the scope of the present invention. Therefore, equivalent variations made according to the claims of the present invention shall fall within the protection scope of the present invention.

What is claimed is:

1. A troubleshooting method, comprising:
   determining, by an aggregation node when a link fault or a device fault occurs on an active optical line termination OLT side, an active logical port used by the active OLT to forward a data packet, wherein the active logical port supports at least one user service, and each user service is denoted by a user service identifier (C-VLAN, S-VLAN) formed by a user local area network tag C-VLAN and a service local area network tag S-VLAN;
   searching, by the aggregation node, a locally stored logical port mapping table according to the active logical port to obtain a standby logical port corresponding to the active logical port, wherein the standby logical port supports a same user service as the active logical port; and
   triggering, by the aggregation node, the standby OLT to enable the standby logical port to receive a data packet that is sent by the standby OLT through the standby logical port.

2. The troubleshooting method according to claim 1, wherein the determining, by an aggregation node, an active logical port used by the active OLT to forward a data packet comprises:
   reporting, by the active OLT, fault information to the aggregation node through an LACP message, wherein the LACP message carries a port number of an active logical port, determining, by the aggregation node according to the port number of the active logical port, an active logical port used by the active OLT to forward a data packet; or, wherein the LACP message carries a user service identifier (C-VLAN, S-VLAN) of a user service supported by the active logical port, determining, by the aggregation node according to the user service identifier (C-VLAN, S-VLAN), an active logical port used to send a data packet corresponding to the user service identifier.

3. The troubleshooting method according to claim 1, wherein the link fault on the active OLT side comprises: an active fiber link fault on the active OLT side or an uplink physical port fault of the active OLT; and the device fault on the active OLT side comprises: an active OLT fault or a PON physical port fault of the active OLT.

4. The troubleshooting method according to claim 3, further comprising a step of detecting a physical port fault of the active OLT, which comprises:
   if the active OLT is not directly connected with the aggregation node, judging, by the aggregation node, the physical port fault of the active OLT by periodically exchanging a continuity detection packet with the active OLT; and, if the active OLT is directly connected with the aggregation node, judging, by the aggregation node, the physical port fault of the active OLT by detecting an optical signal of the physical port of the active OLT.

5. The troubleshooting method according to claim 4, wherein: after the standby OLT enables the standby logical port, a data packet that carries the user service identifier (C-VLAN, S-VLAN) is sent to the aggregation node through the standby logical port.

6. An aggregation node, comprising:
   a memory, configured to store a table of mapping between logical ports of an active optical line termination OLT and a standby OLT;
   a port determining unit, configured to: when a link fault or a device fault occurs on an active OLT side, determine an active logical port used by the active OLT to forward a data packet, wherein the active logical port supports at least one user service, and each user service is denoted by a user service identifier (C-VLAN, S-VLAN) formed by a user local area network tag C-VLAN and a service local area network tag S-VLAN;
   a mapping searching unit, configured to search, according to the active logical port determined by the port determining unit, the logical port mapping table stored in the memory to obtain a standby logical port corresponding to the active logical port, wherein the standby logical port supports a same user service as the active logical port; and
   a port enabling unit, configured to trigger the standby OLT to enable the standby logical port to receive a data packet that is sent by the standby OLT through the standby logical port.

7. The aggregation node according to claim 6, wherein the aggregation node is further configured to receive fault information that is reported by the active OLT through an LACP message;

when the LACP message carries a port number of an active logical port, the port determining unit determines, according to the port number of the active logical port, an active logical port used by the active OLT to forward a data packet; or when the LACP message carries a user service identifier (C-VLAN, S-VLAN) of a user service supported by the active logical port, the port determining unit determines, according to the user service identifier (C-VLAN, S-VLAN), an active logical port used to send a data packet corresponding to the user service identifier (C-VLAN, S-VLAN) and a port number of the active logical port.

8. The aggregation node according to claim 6, wherein the information exchanged between the aggregation node and the active OLT comprises: an LACP message or an OAM message or a continuity detection packet.

9. The aggregation node according to claim 8, wherein: the mapping searching unit searches, according to the port number of the active logical port, the port mapping table for a port number of a standby logical port corresponding to an identifier of the active logical port group, and obtains, according to the port number of the standby logical port, the standby logical port corresponding to the active logical port.

10. An optical network protection system, comprising:

an aggregation node, and at least one active optical line termination OLT and at least one standby OLT that are connected with the aggregation node, wherein the aggregation node is configured to: when a link fault or a device fault occurs on an active OLT side, determine an active logical port used by the active OLT to forward a data packet, wherein the active logical port supports at least one user service, and each user service is denoted by a user service identifier (C-VLAN, S-VLAN) formed by a user local area network tag C-VLAN and a service local area network tag S-VLAN; search a locally stored logical port mapping table according to the active logical port to obtain a standby logical port corresponding to the active logical port, wherein the standby logical port supports a same user service as the active logical port; and trigger the standby OLT to enable the standby logical port to receive a data packet that is sent by the standby OLT through the standby logical port.

\* \* \* \* \*